United States Patent [19]
Clark et al.

[11] 3,947,978
[45] Apr. 6, 1976

[54] EDUCATIONAL LEARNING DEVICE
[75] Inventors: Neil M. Clark, St. Louis Park; Douglas A. Messmer, Minneapolis, both of Minn.
[73] Assignee: Techpower, Inc., Minneapolis, Minn.
[22] Filed: Jan. 31, 1974
[21] Appl. No.: 438,255

Related U.S. Application Data
[62] Division of Ser. No. 204,521, Dec. 3, 1971, abandoned.

[52] U.S. Cl. ................................. 35/48 R; 35/9 D
[51] Int. Cl.² ........................................ G09B 7/06
[58] Field of Search ........... 35/48 R, 9 C, 9 D, 9 B, 35/9 R; 235/61.12 C

[56] References Cited
UNITED STATES PATENTS
2,148,259  2/1939  Cisin ..................................... 35/9 D
2,997,793  8/1961  Kelly ..................................... 35/9 D
3,206,871  9/1965  Schure et al. ......................... 35/48 R
3,478,441  11/1969  Zadig .................................... 35/9 C

Primary Examiner—John H. Wolff
Attorney, Agent, or Firm—Merchant, Gould, Smith, Edell, Welter & Schmidt

[57] ABSTRACT

An answer card and an educational device are disclosed wherein a flexible card has answer selection points on a first side and at least one electrically conductive ink spot on the second side opposite a selection point. The electrically conductive ink spot acts as a switch when the selection point opposite the spot is pressed causing the electrically conductive ink to bridge an open-circuited educational device.

12 Claims, 15 Drawing Figures

EDUCATIONAL LEARNING DEVICE

This is a division of application Ser. No. 204,521, filed on Dec. 3, 1971 of Neil M. Clark, et al. for "Educational Learning Device" now abandoned.

BACKGROUND OF THE INVENTION

1. Field of the Invention

This invention relates generally to electrical educational systems, and more particularly concerns educational devices employing question cards which will complete a circuit when the correct selection point on the card is pushed to close an open-circuited device.

2. Description of the Prior Art

Educational devices are being developed for assisting in teaching information to and testing the proficiency of students, while providing an enjoyable and motivating method of study.

Within the educational art which employs answer cards, systems are known in which cards are inserted into a device and a circuit is closed when a button representing the correct answer is pressed. However, such devices in the past have employed cards from which the correct answer could be determined by observation before the card was placed in the device. Some devices solve this problem but have a disadvantage in the fact that an operator can often memorize the answer sequence of the machine or card and thereby score a correct answer irrespective of his own knowledge or proficiency in the course material. A further disadvantage lies in the high cost of such systems which for all practical purposes removes them from general use by both students and schools alike. U.S. Pat. No. 3,477,143, issued to R. E. Aumann, solves some of the problems in the art. Aumann uses a rather costly answer card having internal electrical conducting wires which complete a circuit on a panel member when a correct switch is pushed on the panel member.

To those versed in the art of education and its current problems it is recognized that there continues to be a need for an inexpensive device which will serve as an aid in the educational process and which is also free from the above-mentioned drawbacks.

It is therefore a principle object of this invention to provide an inexpensive educational device having an answer card on which the electrical conductors can be printed by conventional printing techniques.

It is a further object of this invention to provide a simple and inexpensive electrical teaching system employing paper answer cards having printing ink thereon which do not by their outward appearance reveal the correct answers.

It is a further object of the present invention to provide an inexpensive answer card which itself provides the switch for the panel member and thus eliminates the need for an independent switch.

SUMMARY OF THE INVENTION

In accordance with the invention an educational device is provided wherein an answer card is placeable on an open-circuited panel such that when a selection point on the card is pushed an electrically conductive material on the second side of the card opposite the selection point will bridge the open-circuited panel providing an indication that the selection point has been pushed.

In a preferred embodiment of the invention, the answer card is flexible and has a plurality of answer selection points, a fixed number of the selection points being associated with a particular question, and printed ink spots on the back side of the card opposite each of the selection points. For each set of potential answers one of the ink spots is electrically conductive while the other ink spots are composed of conventional printer's ink. The card having the conductive ink spots can be placed upon an open-circuited panel with the ink spot in resting contact on the terminals of the open-circuited panel. The panel contains a circuit which is able to distinguish between the resting contact of the electrically conducting ink on the panel terminals and the electrical conducting contact of the conductive ink on the panel terminals which occurs when the correct selection point having the conductive ink opposite is pushed.

BRIEF DESCRIPTION OF THE DRAWINGS

In the drawings:

FIG. 1 is a view in exploded perspective of the answer card and panel of a first embodiment of the present invention;

DETAILED DESCRIPTION OF THE DRAWINGS

Turning now to the drawings, FIG. 1 shows a first embodiment of the invention. An answer card 21 is shown which is placeable upon a panel member 23. Panel member 23 has a flat top surface 25, having holes 27, to be described later, in the top thereof, and a housing member 29 for housing electronic circuitry. Housing member 29 additionally carries a switch 30, which must be on in order to operate panel 23, and an indicator light 31.

Figure 2:
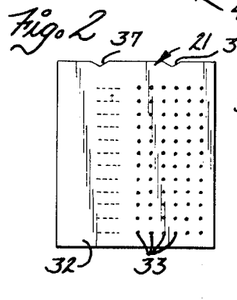
FIG. 2 is a view in top plan of the answer card of the first embodiment.
Figure 3:
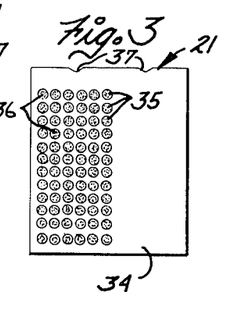
FIG. 3 is a view in bottom plan of the answer card of the first embodiment.

Referring now to FIGS. 2 and 3, there is again shown the answer card 21. For the card 21 we have chosen to use a sheet of paper material, but many other materials will be satisfactory provided they are flexible. The flexibility requirement will become evident. Also, the material should be ink receptive in order to provide for an inexpensive card. FIG. 2 shows the top surface 32 of the answer card 21 where along the left side there may be placed questions or numbers (1 through 12) representing questions which are contained elsewhere. Upon the top surface 32 of answer card 21 there are selection points 33, a certain number of which correspond to each question. For question 1, for instance, the answer may be a, b, c, d, e, or f. When the correct answer or answers are located the corresponding selection point 33 is pushed. Shown in FIG. 3 is the bottom surface 34 of answer card 21 and it has printed ink spots 35 opposite each of the answer selection points 33. For each question at least one ink spot 35 contains electrically conductive ink 36. At the top edge of the answer card 21 indentations 37 are provided in order to cooperate with card positioning posts 38 on panel 23 in order to correctly align the selection points 33 with the holes 27. Additionally, housing 29 may be made to hinge about its back edge allowing the top face 32 of card 21 to slip thereunder and then clamp the card in place.

Figure 4:
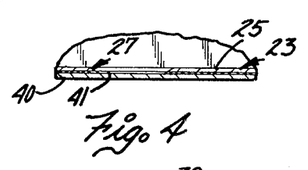
FIG. 4 is an enlarged section of the panel along line 4—4 of FIG. 1.

Turning now to FIG. 4 the hole 27 is shown in greater detail. In the drawing, for purposes of illustration, the holes 27 are shown to have a greater recession from the plane defined by top surface 25 than actually exists. Top surface 25 is insulated from a bottom plate 40 by insulator 41. Top surface 25 and bottom plate 40 are both electrically conductive and can be virtually any conductive material. For purposes of this invention it will be understood that a further nonconductive surface such as a paint could be placed over the surface 25 leaving the recessed portion of surface 25 uncovered.

When answering questions, the operator will press downward upon the selection point 33 which he feels best answers each question 1 through 12. As mentioned, for each answer row there is provided at least one ink spot containing electrically conductive ink which when pressed downward bridges conducting top surface 25 and conducting bottom plate 40.

We have found that the conductive ink sold by the Excello Color and Chemical Co. is virtually indistinguishable from black conventional printer's ink sold by Sun Chemical Co. or Interchemical Corp. Thus, a player cannot turn over the card 21 in order to ascertain which of the selection points 33 has conductive ink disposed opposite thereof in order to determine the correct answer. Other conductive inks which are indistinguishable from conventional printer's ink include a conductive ink sold by Acheson Colloids Company under the product description "ELECTRODAG 415" and also the trade number 4922 conductive ink sold by E. I. DuPont de Nemours & Co. Both the conductive ink spots and the conventional printer's ink spots can be printed on the card 21 using conventional printing techniques.

Figure 5:
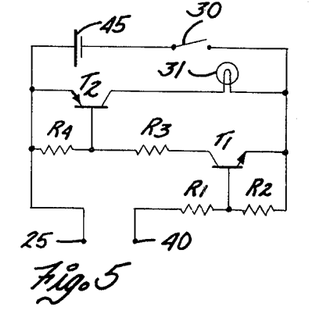
FIG. 5 is an electrical schematic of the circuitry of the panel of the first embodiment.

Referring now additionally to FIG. 5 an electrical schematic of the panel member and the circuitry housed within housing 29 is shown. Top surface conductor 25 is represented by a terminal 25 and bottom plate conductor 40 is represented by a terminal 40. Resistor R1 has a value of 270 ohms, R3 has a value of 27 ohms, and R2 and R4 are 470 ohms. Transistor T1 is a 2N1304 transistor and transistor T2 is a 2N1303 transistor. Indicator light 31, which may be a G. E. No. 131 bulb, is provided in the circuit along with a battery 45, which may be a 1.5 volt battery, and starting switch 30.

In order to appreciate the operation of our invention, some background discussion is necessary. In general, metals such as copper, aluminum, steel, tungsten, etc., are classified as conductors and nearly all other materials are classified as insulators. This view has been eroded and we now know that all materials can conduct a flow of electricity. However, some have a much greater resistance to this flow of electricity than others. Actually, there is no material which could be an absolute barrier to the flow of electricity. The conductive ink 36, which is essential to our invention, is conductive when compared to the ordinary printer's ink, however, it is many orders of magnitude less conductive than a metal wire. This ink was of very little use until the advent of transistors and solid state circuitry. Previous to solid state circuitry, it was necessary to have circuits which would conduct enough energy so that this energy could do useful work, such as make a light glow, run a motor, etc. When solid state circuitry came into existence, it became possible to use circuits with a very low energy carrying capacity for switching on or triggering a high energy circuit which could then do useful work. In this type of circuitry, a transistor is used as a switch. A high energy circuit is set up with a power source, plus whatever device you wish to drive, such as a motor, a lamp, etc. and a transistor. The transistor will act as a switch and will be closed, not allowing any flow of electricity in the high energy circuit, until it receives a signal from the low energy circuit. Involved here is the so-called threshold principle. In other words, there is a level of current flow in a low energy circuit which will cause the transitor to switch on the high energy circuit. Any value below the so-called threshold level will not trigger the transistor. Any value in the low energy circuit above the threshold level will trigger the transistor to switch on the high energy circuit. In our invention, the conductive ink 36 is used in the low energy circuit. Thus, although we have chosen to use a conductive ink it should be understood that for all embodiments there are other materials which are relatively poor conductors and will consequently satisfy the function required of the ink spot 36.

Thus, when the operator selects the selection point 33 which has opposite thereof the electrically conductive ink 36, the flexibility of the answer card allows the electrically conductive ink to bridge terminals 25 and 40 (in order to provide greater assurance of contact, the selection points may contain slits perpendicular to each other). This action causes transistor T1 to fire which in turn fires transistor T2 and allows the battery within the circuit to light indicator light 31. In order to utilize both sides of the card for questions, one of the selection points 33 could contain electrically conductive ink with the questions placed upon the bottom surface 34 and the ink spots 35 used as selection points.

Figure 6:
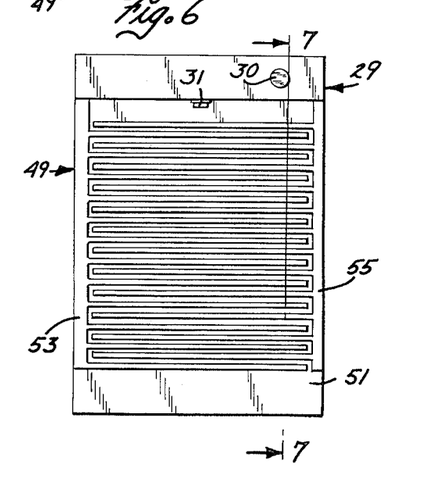
FIG. 6 is a view in top plan of a second embodiment of the panel.

Referrring now to FIG. 6, a second panel embodiment, panel 49, is shown. The card 21, as described in the first embodiment, is used with this panel also. An insulator top surface 51 carrying an electrical conducting path material 53 and a second electrical conducting path material 55 is located on panel 49. Paths 53 and 55 can be any suitable conductor. At the top of the panel 49 is a housing 29 containing an indicator light 31 and a switch 30. Panel 49 also contains card positioning posts 38 (not shown) for positioning the card 21 shown in FIGS. 2 and 3. Card 21 may be clampable under housing 29. Although posts 38 are provided it should be appreciated that with properly sized ink spots 36, both paths 53 and 55 can be bridged even if the card 21 is askew on the panel 49.

Figure 7:
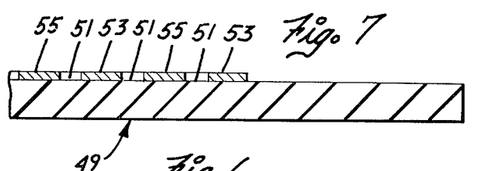
FIG. 7 is an enlarged section of the panels along line 7—7 of FIG. 6.

Referring additionally to FIG. 7, which is a view along line 7—7 of FIG. 6, it can be seen that the electrically conductive path 53 and the electrically conductive path 55 project upward from insulating material 51.

Figure 8:
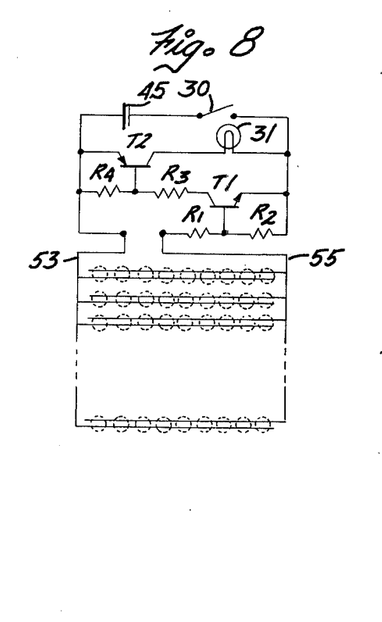
FIG. 8 is an electrical schematic of the panel of the second embodiment.

Referring now additionally to FIG. 8 there is shown the same circuit as in FIG. 5 with conducting paths 53 and 55 shown somewhat as they appear on panel member 49. Once again, the conductive ink 36 is used in the low energy circuit so that when an operator presses the selection point having the conductive ink 36 opposite thereof the conductive ink 36 will bridge electrical conductive path 53 and electrical conducting path 55 causing transistor T1 to fire, which causes transistor T2 to fire and thus allowing indicator light 31 to light indicating to the operator that he has selected the correct selection point. In this embodiment, we are relying on the fact that good electrical conducting relationship between paths 53 and 55 requires intimate physical contact of the two paths with the electrical conductive ink 36. Because the conductive ink is printed on a flexible material such as paper, which is light-weight, we have found that we have virtually no weight or force which will cause a good connection to occur across electrical conducting paths 53 and 55 due to gravity or other natural forces. Experiments have determined that with the answer card 21 in resting contact upon the panel 19 the resistance across the electrical conducting path is still infinite. Thus, it takes an external pressure such as the operator pushing upon the selection point opposite the electrical conducting ink, to make the intimate physical contact with elements 53 and 55 which is necessary in order to conduct electricity through ink 36. We have found that a person pushing downward upon the selection point 33 normally pushes with a finger load of between two and six ounces of force. With this force, and the physical contact of conductive ink 36 with paths 53 and 55 resulting therefrom, the contact resistance across the electrically conductive ink decreases to approximately 650 ohms which is low enough to conduct enough electricity to fire transistor T1. It is evident that for all embodiments, the answer card 21 must be a flexible material in order that the pressing of a selection point can cause electrical contact opposite thereof without causing electrical contact under other selection points.

Figures 9, 10:
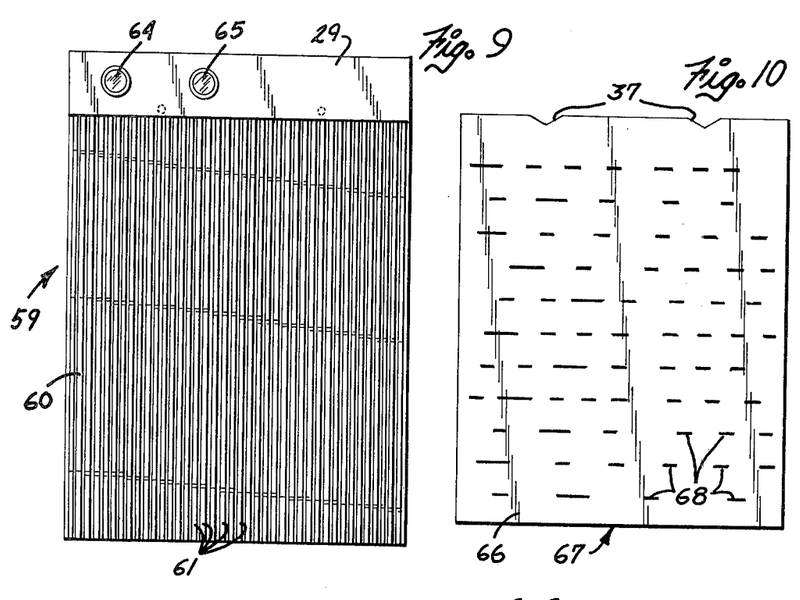
FIG. 9 is a panel for use in a third embodiment of the present invention.
FIG. 10 is a view in bottom plan of an answer card as used in the third embodiment of the present invention.

Referring now to FIG. 9, there is shown another panel embodiment for use with the present invention. Panel 59 has an insulator top surface 60 with conducting paths 61 insulated from each other. At the top of panel 59, housing 29 carries the circuitry, to be described, and also indicator light 64 and a light 65. Light 64 corresponds to a correct selection point being pushed and light 65 corresponds to an incorrect answer.

Referring now additionally to FIG. 10 there is shown the bottom surface 66 of an answer card 67 for use with the panel shown in FIG. 9. Shown on the bottom surface 66 are electrically conducting ink spots 68. Opposite the ink spots, on the top surface of the card, are selection points. The ink spots in each row would correspond to a particular question, as described in conjunction with FIG. 2, and it can be seen that for each row there is one ink spot that is of a larger size than the remainder. As with all embodiments, of course, there could be made more than one ink spot which corresponds to a correct answer, or for that matter, an incorrect answer, and which will cause indicator light 64 to flash. However, for purposes of discussion there is provided only one correct answer and thus only one conductive ink spot which is of greater size than the remainder. Each of the conductive ink spots is located opposite a selection point 33 such that when an operator pushes upon one of the selection points the ink spot will bridge conducting paths 61.

Figure 11:
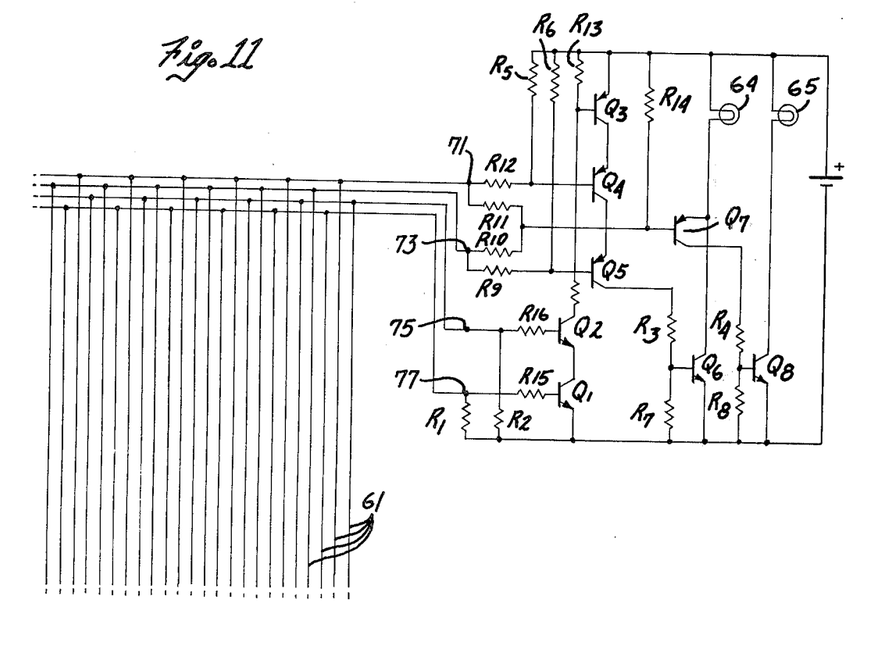
FIG. 11 is an electrical schematic of the panel of the third embodiment.

Referring now additionally to FIG. 11 there is shown the conducting paths 61 which are located upon the panel and also the circuitry which is housed within housing 29.

Within the circuitry, resistors 1 through 6 have a value of 220 ohms, resistors 7 through 14 have a value of 470 ohms and resistors 15 through 17 have a value of 1,000 ohms. Transistors Q1, Q2, Q6 and Q8 are 2N1304 transistors and transistors Q3, Q4, Q5 and Q7 are 2N1303 transistors. Alternate conducting paths 61 are connected to positive input terminals 71 and 73 or to negative input terminals 75 and 77. If any adjacent pair of conducting paths 61 are electrically connected together, by pushing an incorrect selection point having a smaller size conductive ink path 68 opposite thereof, indicator light 65 will be turned on. This is accomplished by current flow between positive terminal 71 or 73 to negative terminal 75 or 77. This current turns on Q7, which turns on Q8, thereby turning on the indicator light 65. Although the current flow through Q7 passes through indicator light 64 it is not of sufficient magnitude to turn it on. In a similar manner, if three adjacent conducting paths 61 are electrically connected, by means of pushing a selection point having opposite thereof a conductive ink spot 68 which is not as large as the largest, the indicator light 65 will be turned on. If the selection point having the largest conductive ink spot 68 opposite thereof is pushed, four adjacent conducting paths 61 will be electrically connected. In this event all four of the input terminals 71, 73, 75 and 77 will be activated. The negative inputs will turn on Q4 and Q5. The on state of Q1, Q2, Q3, Q4 and Q5 will turn on Q6, thereby turning on the indicator light 64. The voltage at indicator light 64 will prevent the turn on of Q7, thereby preventing the turning on of the indicator light 65. As with the second embodiment, we are relying upon the fact that good electrical conducting relationship between paths 61 requires intimate physical contact of the paths with the largest sized electrical conducting path 68, and the circuitry can distinguish this contact from resting contact.

Figure 12:
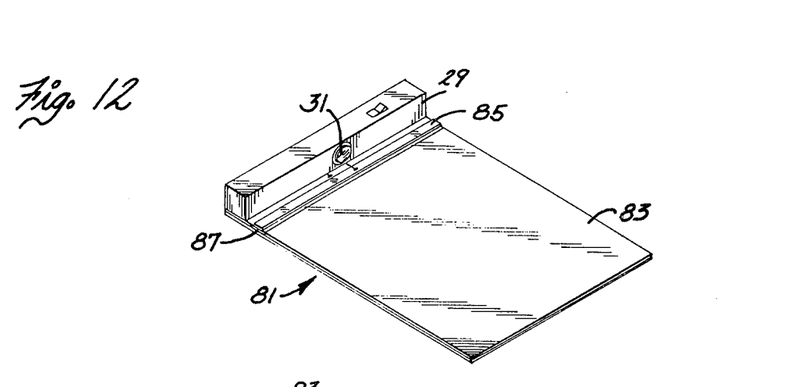
FIG. 12 is a view in perspective of a panel for use in a fourth embodiment of the present invention.
Figure 13:
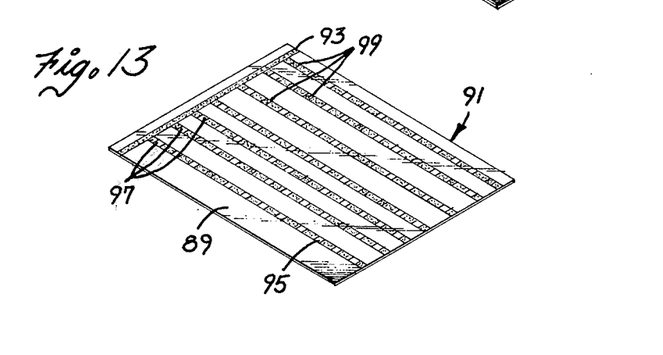
FIG. 13 is a view in perspective of the bottom side of an answer card for use in the fourth embodiment of the present invention.

In FIG. 12 a fourth panel embodiment of the present invention is shown. Panel member 81 contains an electrically conductive top surface 83 and an electrically conductive surface 85 separated from surface 83 by insulator 87. Housing 29 carries an indicator light 31 and a circuit as shown in FIG. 4 with top surface 83 and conducting surface 85 providing the terminals represented by terminals 25 and 40 in FIG. 4. In FIG. 13 the bottom surface 89 of an answer card 91 is shown in perspective. A first conducting path 93 travels across the card 91 so that when the card is in resting contact upon panel 81 and aligned with respect thereto by means of card positioning points (not shown) and by the clamping of housing 29, conducting path 93 will be in physical contact with electrical conducting path 85. Also printed on card 91 are electrical conducting ink paths 95 which travel perpendicularly to ink path 93. A row of potential answers for a first question is shown with nonconductive ink 97 printed over the conductive ink path 95 where the conductive ink path is opposite a selection point on the opposite side of card 91. However, for each set of potential answers one of the conductor paths 95 is not covered with nonconductive ink 97. The point at which the nonconducting ink is not placed over conductive ink path 95 is designed 99.

In the operation of this fourth embodiment, when the operator selects the selection point having no ordinary printer's ink spread over the conducting ink path 95, the conducting ink spot 99 will bridge the circuit between board surface 83 and board surface 85 thus causing indicator light 31 to turn on. With card 91 in resting contact upon panel 81, the conducting paths 95 have too great a resistance to current flow and the light 31 will not light until intimate physical contact is provided by pressing on the selection point.

Figure 14:
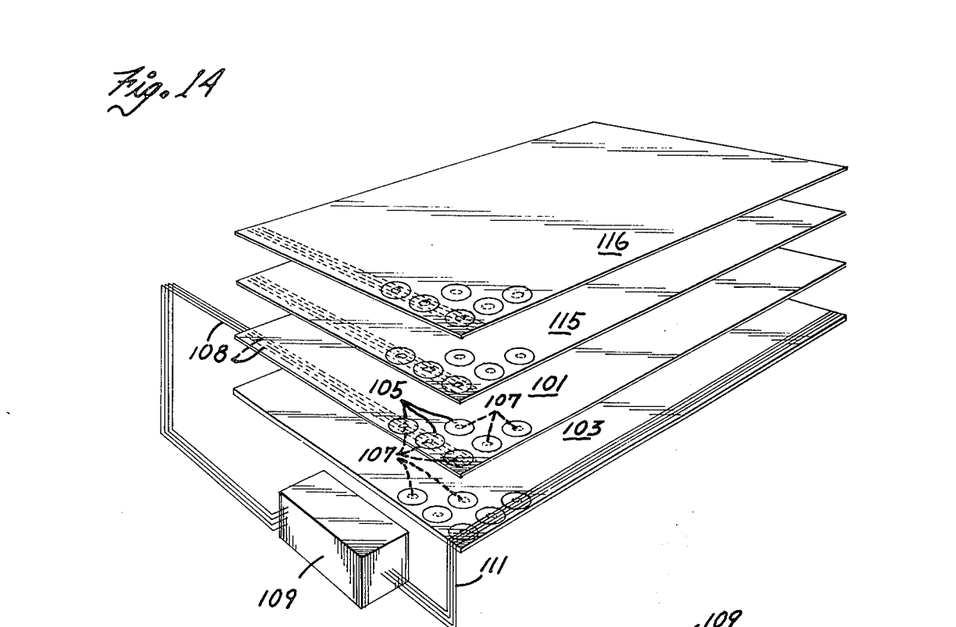
FIG. 14 is a diagramatic view in perspective of a fifth embodiment of the present invention.

In FIG. 14 there is shown a diagrammatic view in perspective of a fifth embodiment of the present invention. In this embodiment an answer card 101 is placeable upon a panel member 103 which, of course, may also be in the nature of an answer card. Answer card 101 contains a plurality of selection points 105 which may be pushed in order that electrical conducting ink spot 107 (actually located on the side of card 101 may shown) can make the necessary electrical conducting contact with panel member 103. Within the area defined by selection point 105 on the bottom surface of card 101, a plurality of electrical conducting wires 108 (shown partially in dotted line), which may be conductive ink, extend across the card 101 and into a computing means 109. Panel member 103 also contains electrically conducting paths 111 which may also be conductive ink and are connected to the computing means 109.

Figure 15:
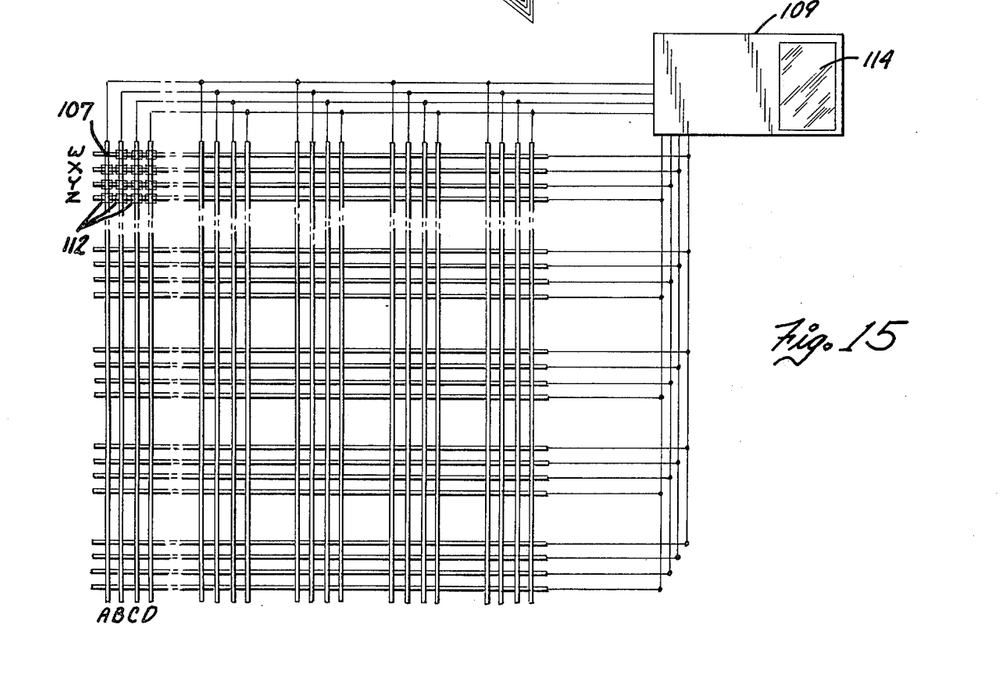
FIG. 15 is an electrical schematic of the fifth embodiment of the present invention.

For an understanding of the cooperation between the answer card 101 and the panel member 103, reference should now be had to FIG. 15. Electrical conducting paths A, B, C and D represent the paths 111 which are disposed upon the top surface of panel member 103. Paths W, X, Y and Z represent electrical conducting paths 108 which are disposed upon the bottom surface of answer card 101. An electrical conducting ink spot 107 is placed over one or more of the electrical conducting paths W, X, Y or Z and is of any desirable size. An electrical nonconductor 112 would be used over the remaining conducting paths. When a selection point 105 on card 101 is pressed downward the electrical conducting ink spot 107 makes electrical conducting contact between whichever electrical conducting paths it is in contact with on card 101 and with path A, B, C or D, or any combination thereof, on panel member 103. It is evident that electrical conducting ink spots 107, when placed beneath a single selection point, can be made to have 256 different combinations between the individual electrical conducting paths in paths 108 and paths 111. The computing means 109, having a visual display 114, would then be able to detect which of the paths W, X, Y or Z, or a combination thereof, was in contact with ink spots 107 and also which of the paths A, B, C or D, or a combination thereof, makes electrical contact with the spots 107 when the selection point 105 is pressed. Of course, the computing means must again distinguish resting contact of ink spot 107 on paths 111 from intimate physical contact associated with pressing a selection point. The addition of additional layers 115 and 116, which are in the nature of answer card 101 and also have conducting ink spots, add to the number of potential wires which may be bridged and determined by computing means 109. It is evident that this sophisticated network is not necessary for the student in working a simple educational device, but it is disclosed in order to understand the entire scope of possibilities which may be made to exist by use of our invention.

Thus, it is apparent that there has been provided, in accordance with the invention, an answer card and educational device to fully satisfy the objects, aims, and advantages as set forth. While the invention has been described in conjunction with specific embodiments thereof, it is evident that many alternatives, modifications and variations would be apparent to those skilled in the art in light of the foregoing description. Accordingly, it is intended to embrace all such alternatives, modifications and variations which fall within the spirit and broad scope of the appended claims.

What is claimed is:

1. An electronic device, comprising:
  a. a panel member carrying a plurality of electrical conducting paths insulated from each other on a top surface of said panel member;
  b. a switching device removably positioned upon said panel member top surface including,
    1. a sheet-like member of flexible, electrically nonconducting material having a top surface and a bottom surface, said flexible member bottom surface being positioned on said panel member top surface;
    2. a plurality of selection areas disposed upon said flexible member top surface, said selection areas being grouped into a plurality of series, each series having a group of selection areas associated therewith; and
    3. an electrically conductive material disposed upon said flexible member bottom surface opposite one of said selection areas for each series;
  c. means in operative combination with said panel member for indicating that said selection area opposite said electrical conducting material has been pressed including,
    1. a low energy circuit,
    2. a high energy circuit having an indicator means; and
    3. switch means in said low energy circuit responsive to at least a particular level of current flow in said low energy circuit for causing current flow in said high energy circuit; and
  d. said electrically conductive material operative to bridge said panel member electrical conducting paths thus completing said low energy circuit and switching on said high energy circuit, when said selection area having electrically conductive material opposite thereof is pressed.

2. The electronic device of claim 1, wherein said flexible material is ink receptive, and said electrically conductive material is an electrically conductive ink.

3. An educational device, comprising:
  a. a panel member carrying a plurality of electrical conducting paths insulated from each other on a top surface of said panel member;
  b. an answer card removably positioned upon said panel member top surface including,
    1. a sheet-like member of flexible, electrically nonconducting material having a top surface and a bottom surface, said flexible member bottom surface being positioned on said panel member top surface,
2. a plurality of answer selection areas disposed upon said flexible member top surface, some of said selection areas being associated with an individual question, and
3. an electrical conductive material disposed upon said flexible member bottom surface opposite one of said selection areas for each individual question;
c. means in operative combination with said panel member for indicating that said selection area opposite said electrical material has been pressed including,
1. a low energy circuit;
2. a high energy circuit having an indicator means; and
3. switch means in said low energy circuit responsive to at least a particular level of current flow in said low energy circuit for causing current flow in said high energy circuit; and
d. said electrically conductive material operative to bridge said panel member electrical conducting paths thus completing said low energy circuit and switching on said high energy circuit, when said selection area having electrically conductive material opposite thereof is pressed.

4. The device of claim 3 including an electrically non-conductive material disposed upon said material bottom surface opposite the other of said selection points associated with an individual question.

5. The device of claim 4, wherein said electrically conducting material is visually indistinguishable from said electrically nonconductive material.

6. The device of claim 5 wherein said flexible material is ink receptive and said electrically conductive material is an electrically conductive ink, and said electrically nonconductive material is electrically nonconductive ink.

7. An electronic device, comprising:
a. a panel member carrying a plurality of electrical conducting paths insulated from each other on a top surface of said panel member;
b. a switching device removably positioned upon said panel member top surface including,
1. a sheet-like member of flexible electrically non-conductive material having a top surface and a bottom surface, said flexible member bottom surface being positioned on said panel member top surface,
2. at least one answer selection area disposed upon said flexible member top surface,
3. a plurality of electrical conducting paths disposed upon said flexible member second surface opposite at least one of said selection areas,
4. an electrically conductive material disposed upon said second surface opposite at least one of said selection areas and in electrical contact with at least one of said flexible electrical conducting paths, and
5. an electrically nonconductive material disposed upon said second surface for separating the electrical conducting paths not in electrical contact with said electrically conductive material from said panel member electrical conducting paths;
c. means in electrical contact with said flexible member electrical conducting paths and with said panel member electrical conducting paths for indicating which of said flexible member electrical conducting paths is in electrical contact with said electrically conductive material and which of said panel member electrical conducting paths makes electrical conducting contact with said electrical conducting material when said selection area is pressed and including,
1. a low energy circuit;
2. a high energy circuit having an indicator means; and
3. switch means in said low energy circuit responsive to at least a particular level of current flow in said low energy circuit for causing current flow in said high energy circuit; and
d. said electrically conductive material operative to bridge said panel member electrical conducting paths thus completing said low energy circuit and switching on said high energy circuit, when said selection area having electrically conductive material opposite thereof is pressed.

8. The device of claim 7 wherein said flexible material is ink receptive, and said flexible material conducting paths and said electrically conductive material are electrically conductive ink.

9. An educational device, comprising:
a. a panel member carrying a first and a second electrical conducting path insulated from each other on a top surface of said panel member;
b. an answer card removably positioned on said panel member top surface including,
1. a flexible sheet-like member of electrically nonconductive material having a top surface and a bottom surface, said flexible member bottom surface being positioned on said panel member top surface,
2. a plurality of answer selection areas disposed upon said flexible member top surface, some of said selection areas being associated with an individual question,
3. electrical conductive paths disposed upon said flexible member bottom surface, part of said path being opposite each of said selection areas, said paths being in electrical conducting contact with said first panel member electrical conducting path, and
4. an electrical nonconducting material disposed opposite all but one of said answer selection areas corresponding to a question and separating said answer card electrically conducting path from said panel member second electrical conducting path where said answer card electrically conducting path is opposite said selection area;
c. means in operative combination with said panel member responsive to said answer card conducting path being brought into electrical conducting relationship with said second panel member electrical conducting path for indicating that said selection areas without said electrically nonconductive material located opposite has been pressed, and including,
1. a low energy circuit;
2. a high energy circuit having an indicator means; and
3. switch means in said low energy circuit responsive to at least a particular level of current flow in said low energy circuit for causing current flow in said high energy circuit; and
d. said electrically conductive material operative to bridge said panel member electrical conducting paths thus completing said low energy circuit and switching on said high energy circuit, when said selection area having electrically conductive material opposite thereof is pressed.

10. The device of claim 9 wherein said answer card is ink receptive and said answer card electrical conducting path is electrically conductive ink.

11. An educational device, comprising:
   a. a panel member carrying a plurality of evenly spaced electrical conducting paths insulated from each other on a top surface of said panel member;
   b. an answer card removably positioned upon said panel member top surface including,
      1. a sheet-like member of flexible, electrically non-conducting material having a top surface and a bottom surface, said flexible member bottom surface being positioned on said panel members top surface,
      2. a plurality of answer selection areas disposed upon said flexible member top surface, some of said selection areas being associated with an individual question, and
      3. an electrical conductive material disposed upon said flexible member bottom surface opposite one of said selection areas for each individual question of a size greater than electrically conductive material disposed upon said flexible member bottom surface opposite the other of said selection areas associated with an individual question;
   c. means in operative combination with said panel member for indicating that said selection area opposite said electrical material has been pressed and for distinguishing between the pressing of said selection area having said greater sized electrically conductive material opposite and the pressing of the other of said selection areas, including,
      1. a low energy circuit;
      2. a high energy circuit having an indicator means; and
      3. switch means in said low energy circuit responsive to at least a particular level of current flow in said low energy circuit for causing current flow in said high energy circuit; and
   d. said electrically conductive material operative to bridge said panel member electrical conducting paths thus completely said low energy circuit and switching on said high energy circuit, when a selection area having electrically conductive material opposite thereof is pressed.

12. The device of claim 11 wherein said flexible material is ink receptive and said electrically conductive material is electrically conductive ink.

* * * * *